(12) United States Patent
Dawson et al.

(10) Patent No.: US 7,328,001 B2
(45) Date of Patent: Feb. 5, 2008

(54) TRAFFIC SHAPING OF CELLULAR SERVICE CONSUMPTION THROUGH MODIFICATION OF CONSUMER BEHAVIOR ENCOURAGED BY CELL-BASED PRICING ADVANTAGES

(75) Inventors: Christopher James Dawson, Arlington, VA (US); Rick Allen Hamilton, II, Charlottesville, VA (US); James Wesley Seaman, Falls Church, VA (US); Timothy Moffett Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 10/912,478

(22) Filed: Aug. 5, 2004

(65) Prior Publication Data
US 2006/0030291 A1 Feb. 9, 2006

(51) Int. Cl.
*H04M 11/00* (2006.01)

(52) U.S. Cl. .................. 455/406; 455/405; 455/408; 455/414.1; 379/114.1; 379/114.12; 379/114.13; 379/114.28

(58) Field of Classification Search ........ 455/405–408, 455/414.1, 435.2, 453, 455, 457, 515, 516, 455/566, 414.3, 414.4, 432.1, 414.2; 379/111, 379/114.01, 114.06, 114.1, 114.13, 114.2, 379/114.28, 121.02, 122, 127.05, 114.03, 379/114.12, 133, 134
See application file for complete search history.

(56) References Cited

U.S. PATENT DOCUMENTS

| | | | |
|---|---|---|---|
| 5,526,403 A | 6/1996 | Tam | 379/59 |
| 5,535,274 A | 7/1996 | Braitberg et al. | 379/446 |
| 5,602,900 A | 2/1997 | Hattori et al. | 379/58 |
| 5,678,200 A | 10/1997 | Levi | 455/88 |
| 5,794,140 A * | 8/1998 | Sawyer | 455/408 |
| 5,835,785 A | 11/1998 | Overtoom et al. | 395/834 |
| 5,848,138 A * | 12/1998 | Sarpola et al. | 379/114.01 |
| 5,937,334 A | 8/1999 | Peterson et al. | 455/74.1 |
| 5,970,403 A * | 10/1999 | Alperovich et al. | 455/406 |
| 5,974,308 A * | 10/1999 | Vedel | 455/407 |
| 6,006,085 A * | 12/1999 | Balachandran | 455/406 |
| 6,009,154 A * | 12/1999 | Rieken et al. | 379/114.12 |
| 6,028,537 A | 2/2000 | Suman et al. | 340/988 |
| 6,122,531 A | 9/2000 | Nicholis et al. | 455/570 |
| 6,131,042 A | 10/2000 | Lee et al. | 455/556 |
| 6,134,306 A * | 10/2000 | Lautenschlager et al. | 379/114.28 |
| 6,212,273 B1 | 4/2001 | Hemkumar et al. | 379/410 |
| 6,275,695 B1 * | 8/2001 | Obhan | 455/423 |
| 6,289,382 B1 | 9/2001 | Bowman-Amuah | 709/226 |

(Continued)

*Primary Examiner*—William Trost
*Assistant Examiner*—James D Ewart
(74) *Attorney, Agent, or Firm*—Robert H. Frantz; David A. Mims, Jr.

(57) ABSTRACT

Changes in wireless service user behavior are encouraged and produced to shape utilization patterns among cells within a rate plan region by using shaping rules which define potential discounts from a standard charge rate under certain cell-specific utilization conditions, analyzing the shaping rules and utilization statistics of a cell upon service initiation, generating a discount from the standard rate for underutilized cells. The user is notified of these discount opportunities using text messages, icons, or other means. Over time, the users learn that at certain places and times, significant discounts are offered, and thus changes their behavior to take advantage of those discounts, thereby shaping traffic in a manner desired by the service provider.

24 Claims, 14 Drawing Sheets

U.S. PATENT DOCUMENTS

| | | | | |
|---|---|---|---|---|
| 6,324,404 B1 * | 11/2001 | Dennison et al. | ......... | 455/456.1 |
| 6,332,075 B1 * | 12/2001 | Verdonk | ............. | 455/408 |
| 6,377,825 B1 | 4/2002 | Kennedy et al. | ............. | 455/569 |
| 6,418,312 B1 * | 7/2002 | Cutler | ............. | 455/427 |
| 6,493,547 B1 * | 12/2002 | Raith | ............. | 455/405 |
| 6,516,190 B1 * | 2/2003 | Linkola | ............. | 455/408 |
| 6,553,217 B1 * | 4/2003 | Kundorf | ............. | 455/406 |
| 6,556,817 B1 * | 4/2003 | Souissi et al. | ............. | 455/406 |
| 6,577,717 B1 * | 6/2003 | Henon | ............. | 379/114.01 |
| 6,671,285 B1 * | 12/2003 | Kirkby et al. | ............. | 370/468 |
| 6,892,063 B2 * | 5/2005 | Savolainen | ............. | 455/405 |
| 6,934,527 B1 * | 8/2005 | Hamada | ............. | 455/405 |
| 6,975,850 B1 * | 12/2005 | Hurtta et al. | ............. | 455/405 |
| 6,977,904 B2 * | 12/2005 | Satoh | ............. | 370/252 |
| 6,999,748 B2 * | 2/2006 | White | ............. | 455/406 |
| 7,003,279 B2 * | 2/2006 | Nickum | ............. | 455/405 |
| 7,006,831 B2 * | 2/2006 | Matz et al. | ............. | 455/453 |
| 7,039,424 B2 * | 5/2006 | Gorsuch | ............. | 455/456.3 |
| 7,054,642 B1 * | 5/2006 | Matz et al. | ............. | 455/453 |

* cited by examiner

*Prior Art*

Monthly Rate Plan (Max. Minutes Per Month and Cents per Minute over Max.)

| Region | Type | Day | Night | Weekend | Anytime |
|---|---|---|---|---|---|
| Local | Voice | LV-Day | LV-Night | LV-Wkend | LV-Anytime |
| | Data | LD-Day | LD-Night | LD-Wkend | LD-Anytime |
| | Pic/Video | LP-Day | LP-Night | ... | ... |
| | Text Msg. | LM-Day | ... | ... | ... |
| | Web | LW-Day | ... | ... | ... |
| Extended | Voice | XV-Day | XV-Night | ... | ... |
| | Data | XD-Day | XD-Night | ... | ... |
| | Pic/Video | XP-Day | XP-Night | ... | XW-Anytime |
| | Text Msg. | ... | ... | ... | ... |
| | Web | | | | |
| Roaming | Voice | RV-Day | RV-Night | ... | ... |
| | Data | RD-Day | RD-Night | ... | ... |
| | Pic/Video | ... | ... | ... | ... |
| | Text Msg. | | | | |
| | Web | | | | RW-Anytime |

Figure 5

TRAFFIC SHAPING OF CELLULAR SERVICE CONSUMPTION THROUGH MODIFICATION OF CONSUMER BEHAVIOR ENCOURAGED BY CELL-BASED PRICING ADVANTAGES

FEDERALLY SPONSORED RESEARCH AND DEVELOPMENT STATEMENT

This invention was not developed in conjunction with any Federally-sponsored contract.

CROSS-REFERENCE TO RELATED APPLICATIONS

Not applicable.

MICROFICHE APPENDIX

Not applicable.

INCORPORATION BY REFERENCE

None.

BACKGROUND OF THE INVENTION

1. Field of the Invention

This invention relates to technologies and business processes for dynamic cellular phone rate pricing based on cellular traffic patterns, and especially to methods and systems which encourage consumer behavior changes which optimize loading of equipment and return on investment for cellular infrastructure.

2. Description of the Related Art

Millions of people around the world use cellular phones as a means to talk with one and another and to access to various sources of information. With a cellular telephone, users are able to use an incredible array of features and functions such as storing contact information, making to-do task lists, sending or receiving text or voice messages and being able to connect to the Internet.

Regardless on the makes and models of cellular phones being supplied to the marketplace, cellular phone companies actively offer different rate plans to attract and retain new and existing customers. Various rate plans include, but are not limited to, prepaid, area-limited and either one or two-tiers of time-based services such as "peak," "off-peak," and "nights and weekends." The last being the most commonly used in today's marketplace.

A cell phone is actually a sophisticated radio that functions along with cell phone towers. The battery-powered, portable devices which perform wireless networking for voice and/or data communications as all or part of their functionality are well known in the art, including but not limited to:

(a) cellular telephones;
(b) wireless web browsers;
(c) cordless telephones and cordless small office/home office ("SOHO") telephone switch systems;
(d) laptop computers, palm top computers and personal digital assistants ("PDA") equipped with wireless local area network ("LAN") or cellular data interface cards; and
(e) one-way, two-way, text and voice pagers and terminal devices.

For the remainder of this description, we will refer primarily to cellular telephone examples and implementations to be representative of a range of these devices. Certain terms from cellular telephone parlance are analogous in functionality to terms from other networking technologies, such as Personal Communications Systems ("PCS") towers being similar to "base stations" or wireless access points. It will be readily recognized by those skilled in the art, however, that the problems and the invention presented herein are common to all the various wireless network battery-powered devices as previously exemplified.

A key aspect of each cellular system is the division of a service area into small "cells", each cell being served by a single tower, access point or base station. Turning to FIG. 1, two "cells" (10, 11) are shown geographically adjacent to each other, each cell having a "tower" (12, 13) located at its center. Typically, cells are considered to be of hexagonal shapes (15, 17) for network planning and management purposes in PCS architecture, but in reality, the signals from the towers propagate equally well for a generally circular area (14, 16) of coverage. This often produces areas of coverage overlap (18) between adjacent cells. In practice, a cellular system (19) comprises multiple cells in a honeycomb arrangement, but only two adjacent cells are shown here for ease of understanding.

When a terminal device such as PCS handset or wireless web browser is at a position $P_1$ outside of reception range (14, 16) of a tower within the system, the device will be unable to perform its functions such as making or receiving telephone calls, performing data communications, receiving text messages, etc. Most systems will continuously "search" for a tower signal, performing some type of protocol to make contact with one or more towers which may be within reception range.

This process of searching may simply include measuring a signal strength on a frequency and/or channel from the tower, or may be more active such as sending or transmitting a signal from the device's transmitter to initiate a contact with an in-range tower. While the former approach will consume some power for the search, the latter almost always consumes even more power as transmission of signals is usually a more power intensive operation than simply receiving a signal.

As a device reaches or travels to a position $P_2$ in the "fringe" area of coverage for a tower, it may detect a usable signal strength from the tower (12) within its reception range, and/or may be able to effectively transmit a code, registration or other signal to the tower (12). At this position, the device is technically within the tower's cell (10).

The "logging in" or "registration" process as a device enters a tower's cell varies between different wireless technologies. For example, the registration process employed by PCS systems is different than the registration process used by its predecessor "analog" (e.g. "AMPS") cellular system, and both are very different than the registration process employed by wireless data networking technologies such as BlueTooth, IEEE 802.11b, Motorola's Ricochet network, and two-way pager networks, etc. For illustrative purposes, however, we now present a brief overview of the PCS registration process.

Cell phones and base stations use low-power transmitters, so that the same frequencies can be reused in non-adjacent cells which allows millions of people to use call phones simultaneously. Each city comprises, for example, of hundreds of towers while each carrier in each city runs one central office called Mobile Telephone Switching Office ("MTSO"), which handles all of the phone connections to the normal land-based phone system and controls all of the base stations in the region. A cell phone is composed of three unique codes that help carriers identify each gadget and facilitate call transmission. Each cell phone has its unique 32-bit number programmed into the phone when it is manufactured called Electronic Serial Number ("ESN"). Once service is activated, the cell phone will have the 10-digit phone number called the Mobile Identification Number ("MIN") and an unique 5-digit number that assigns to each carrier (e.g. Sprint, MCI, AT&T, Verizon, etc.) by the Federal Commission ("FCC") called the System Indentication Code ("SID") programmed.

When a cell phone is first powered up, it "listens" for an SID on the control channel. The phone and base station uses the control channel, a predetermined special frequency, to talk to one another about things like call set-up and channel changing. If the phone cannot find any control channel to listen to, then it knows that it is out of range and displays a "No Service" indicator or "Out of Range" message. When the phone receives the SID, it compares it to the SID programmed into the phone. If authentication is successful, then the phone is communicating with its home system. The phone transmits a registration request along with the SID, which is received by one or more towers within range while the MTSO keeps track of your phone's location in a database. For example, in FIG. 1, if the handset is in position $P_2$, only one tower (12) may receive the registration request. If the handset is in position $P_4$, however, when it is powered ON initially, it may be within the overlap of multiple cells, and the registration request may be received by multiple towers (12, 13), or may be directed to the tower for which the strongest signal strength is detected.

This allows the MTSO to know which cell grid the user is currently in so it knows when to ring the phone. When the MTSO receives a call, it searches the database to see which cell the user is in. The MTSO selects a frequency pair that the phone will use in the cell grid to take the call. By using the control channel, the MTSO communicates with the phone to inform which frequencies to use. Once the user's phone switches on those frequencies, the call will be connected.

Many wireless networked systems are designed to handle providing continuous service as a unit travels from one cell to another, while other technologies do not provide this functionality. For example, a PCS telephone is expected to be used in a moving vehicle or while walking, and as such, the PCS system specifications and design include protocols and schemes for "hand off" of service to a handset from one cell tower to another. So, for example, as a handset moves from position $P_3$ to position $P_4$, and then to position $P_5$, the handset may initially be served by a first tower (12), and then be handed off to another tower (13) according to signal strength criteria and channel availability in each area of coverage (14, 15).

The cellular base station constantly notes a user's signal strength is diminishing as the user moves toward the edge of the base cell grid. At the same time, the base station in the cell the user is moving toward is aware of the increasing phone signal strength by listening and measuring signal strength on all frequencies. Then, the two base stations coordinates with each other through the MTSO, and at some point, your phone gets a signal via control channel to change frequencies. This hand off switches the user's phone to the new cell. If the SID on the control channel does not match the SID programmed on the mobile device, then the phone knows that it is roaming. The local MTSO of the cell where the user is roaming will contact the MTSO of the home system to verify its database that the phone's SID is valid. Once verification occurs, the local MTSO will track roaming usage as the phone moves through its cell.

Turning to FIG. 2, a larger portion of a cellular network (24) is illustrated, to show how a terminal or handset may traverse multiple positions $P_1$, $P_2$, $P_3$, $P_4$, $P_5$, $P_6$, $P_7$, and $P_8$, starting outside a network, entering the fringe of the network, passing through and being served by multiple cells (20, 21), and finally passing through the fringe and out of the network. Certain cells (23, 22) may never provide service to the handset based upon its position and proximity to other, closer towers.

Turning to FIG. 3, a generalized architecture (40) of these types of hardware platforms is depicted. Although each actual device available on the market may vary in detail from this depiction, the general functionality and capabilities of each platform fit within the general view of this figure. Each system typically includes all or some of the following functions:

(41) a microprocessor, microcontroller, or control logic for implementing the logical processes of the unit;

(42) one or more application specific integrated circuits ("ASIC") for voice compression, decompression, protocols, error checking/correction, security, encryption/decryption, and radio signal modulation/demodulation;

(43) an audio microphone and speaker or earphone for audible interfacing with the user;

(44) a radio frequency ("RF") frontend including intermediate frequency stages, and an antenna (45) for receiving and transmitting RF signals (401) from and to a tower, base station, or wireless access point (404);

(46) one or more memory devices and types including some or all of Random Access Memory, FLASH Read Only Memory, battery-backed memory, and Read Only Memory, with one or more memory expansion slots (47) in some cases;

(48) a display such as an liquid crystal display (LCD), color TFT, or cathode ray tube (CRT) display, often coupled with a touch screen sensor for receiving user input and selections, typically provided with a keypad or keyboard or other special buttons for receiving user input and selections;

(49) often several external I/O connectors for battery chargers, external speakers and microphones, expansion keyboards and displays;

(400) often additional data interfaces such as IrDA or PCMCIA slots for receiving add-on hardware, interfaces, program packs, or software; and (403) a clock, timer and/or calendar for keeping time in units such as seconds, minutes, hours, days, months and years.

More advanced wireless network devices may include a location technology in detail such as a GPS receiver or E911 capability (402).

As mentioned before, carriers offer a wide range of cellular rate plans to users. Most services providers offer three different levels of coverage such as local, regional and national, generally illustrated in FIG. 4. Local coverage (451) usually limits service area to a particular metropolitan area. The plan typically provides more minutes per month than other coverage plans for local call, and calls in extended (453) area may be higher. Calls originated from a roaming (452) area may incur charges from other carriers, as well. Other regions (450) may not have coverage at all.

Some carriers now offer unlimited local airtime to lure customers. Many recoup their costs by charging more per minute for roaming and by tacking on a per-minute airtime charge for calls made outside the local area.

Regional coverage enlarges the service area to include the entire state as well as selected surrounding ones. For example, local coverage in a southeastern U.S. plan might include Alabama, Arkansas, Florida, Georgia, Kentucky, Louisiana, Mississippi, North Carolina, South Carolina, Virginia and Tennessee. Calls within and between any of these states don't have any associated roaming and long distance charges. These plans cost more and also give you fewer airtime minutes per month than similarly priced local plans. In addition, if one uses more minutes than provided within the plan, a surcharge will apply for extra usage.

National coverage (453) is often a flat-rate national plan, that is available anywhere in the United States where the carrier offers service with no roaming or long distance charges. Most carriers reach close to 95 percent of the United States with a combination of analog and digital service. National plans offer even less airtime per month than regional plans and are usually the most expensive option.

The very popular service plan most consumers use today is the fixed monthly rate pricing that buys a certain number of airtime minutes for both peak and off-peak hours and other extra features for add-on such as text messaging, call waiting and Internet browsing. After a customer passes a credit check, carriers usually recommend signing a contract for a certain period of time from eleven months to three years. The carrier, in return, offers free or steeply discounted phones, accessories and even pricing plans for the duration. Like any other contract with its provisions, should the user decide to cancel before the term of the contract, a steep penalty charge is incurred.

Turning to FIG. 5, a typical monthly rate plan is shown in table form. The rate table (50) includes a number of "types" of services, such as minutes of voice usage in the local calling area, in the rows (51). The pricing or allowed consumption varies based on several characteristics such as the coverage area (51), type of service (52), number of minutes included based on minute types such as daytime (53), nighttime (54), weekend (55) or anytime (56). So, for each entry in the table, a carrier may define a maximum number of minutes included in the rate plan, and may define a surcharge for each minute of that type of service over the prepaid amount in a period of time such as a month.

For example, at $39.99 a month, hypothetically called "MetroTalker", a consumer can have the standard local voice 3000 minutes which consists of 500 daytime minutes (LV-Day) from 7 AM to 7 PM on weekdays, 2000 nights (LV-Night) after 7 PM on weekdays, 500 weekends (LV-Weekend) and zero anytime (LV-Anytime) minutes. For any additional minutes use, depending on time period, a surcharge is incurred on a per minute basis. For example, day overage charge may be 14 cents per minute, and night or weekend overcharge may be 8 cents per minute. So, the entries in the table (50) for this rate plan "MetroTalker" would be:

LV-Day=(500, 14)
LV-Night=(2000, 8)
LV-Weekend=(500, 8)
LV-Anytime=(0, 0)

Similarly, extended area and roaming minute maximums and overcharges can be defined for voice services, as well as defined for other types of calls (e.g. data, pictures, text messaging, web browsing).

It is important to note, however, that these rate plans take into account the time of day and week of the service usage (e.g. night vs. day, weekend vs. weekday), the type of usage (e.g. voice, data, browsing, etc.), and the service region or area from which the call originates, wherein each region or area contains multiple cells (e.g. multiple towers).

Turning to FIG. 6, a generalization of the present-day billing reconciliation process (60) is shown. The mobile device (61) makes a call through a tower (62), and its service usage data is recorded by a base station (63). The base station (63), also captures the time and day of the usage (64). The base station is not aware of specific rate plans the mobile device is assigned because it can be a MTSO of another carrier.

Usage records (65, 65') are transferred to a billing server (66) for accounting processing. The billing server consolidates the usage records, verifies them against rate plans (68) and gathers customer profile information (67) to generate customer monthly invoice (69). The billing plan is either time-based or rate plan based.

It is important to note, again, that the invoice to the customer contains calculations and charges based upon the minutes of service used during a billing cycle, when those minutes were used (e.g. time, day of week), and the region from which the service originated or was consumed (e.g. home, extended, roaming, etc.). There is no calculation of the charges due to the customer based upon any other factors typically.

As such, cellular phone carriers offer fixed rate plans which do not take into account the geographically based costs associated with cellular services within regions of service. Geographic costs associated with cellular telephone usage include the cost of land lease, towers, switches, and other associated processing equipment, the human costs of cellular company employees, and the costs associated with service levels.

For example, consider a local region that has 67 towers or 67 cells in it. Each of those towers has its own set of costs: cost of leasing the land on which the tower is placed, cost of operating and maintaining the equipment in the tower and base station, etc. Some towers are owned by the service provider, while others are leased from other owners.

For instance, in a low usage cell, underutilized equipment is a cost, and inversely, in an overly busy area, excessive usage may drive the need for additional bandwidth. Similarly, newer towers may be more costly than older, depreciated towers. But, the fees collected from the users for using these different towers or cells within a rate region are the same. For example, let's assume a prepaid cellular plan provides for debiting a user's account balance at the rate of 9 cents per minute for calls made from home region. Also assume, again, that there are 67 towers in the home region. Further assume that cell #19 is the newest cell, and has a cost of operation of 15 cents per minute, and that cell #45 is the oldest cell and has a cost of operation of 2 cents per minute.

If the user makes a call from cell #19, the revenue from the call is 9 cents per minute, even though the cost to operate the cell is 15 cents per minute. So, calls handled by this cell under this rate plan actually lose 6 cents per minute. However, calls originating from cell #45 produce a positive revenue of 7 cents per minute.

To be profitable, the sum total of all of the cellular operational costs in a calling region must not exceed the sum total of the revenue from service consumed by all users on all rate plans within that region.

Often times, though, the newer and more expensive to operate cells are also the most heavily used. Consider a growing metropolitan area in which a downtown area is experiencing a business boom. This means that more towers will be needed in the downtown area. But, these new towers fall within the existing "local" region of rate plans, and as such, the revenue from their usage will be the same as that from the existing towers in the local region. Thus, to meet increasing demand and traffic, carriers are often forced to install new equipment, which often results in a negative revenue generation.

Carriers currently have no means for redirecting calls and services from a higher cost cell to a lower cost cell, especially for cells within the same rate region. Therefore, there exists a need in the art for a method which utilizes service consumption to modify consumer behavior encouraged by geographical-based pricing advantages related to cellular operational characteristics within a rate plan region.

It would be difficult to publish a map of cells within regions to users, especially considering the overlap of coverage between adjacent cells. Radio range coverage not only varies based upon geographical conditions (e.g. hill sides, buildings, etc.), but also upon varying weather conditions.

Additionally, rate plans are already complicated and many consumers complain about their inability to understand the pricing schemes already employed. Publishing a rate plan which breaks the fees into cells within regions would further exasperate this problem.

Further, publishing rate plans and brochures is costly, and therefore is only performed periodically by cell phone companies. However, changes to usage and costs of individual cells is relatively dynamic. It would not be practical, however, to publish a new rate plan brochure or guide daily or weekly in order to update costs of usage by cell.

In some jurisdictions, rate plans must be approved by a regulatory body or agency, which can be costly, timely and laborious to update. For this reason as well, dynamically changing a rate plan is not desirable.

Therefore, there additionally exists a need in the art for a new system and method for adapting service usage among multiple cells within a rate plan region without requiring new rate plans to be published, documented, authorized, approved, comprehended or adopted.

SUMMARY OF THE INVENTION

The present invention enables wireless service providers to selectively enhance the utilization of cell towers through consumer behavior modification based on dynamically generated market incentives. Our invention allows wireless service providers to use dynamic pricing and discounts correlated to specific cells in which the consumer wishes to use service as a mechanism, in a more effective manner, to affect individual cell tower usage.

According to one aspect of the present invention, pricing models become more dynamic in response to real-time usage data. Rather than using the traditional area coverage rate plan, or in addition to a traditional area-based plan, a graduated stand-alone or graduated comparative pricing model is introduced by the invention, in which the users are shown in real-time dynamically generated pricing and cost incentives to delay usage in high-traffic or high-cost-of-operation cells, and to encourage usage in low-traffic or low-cost-of-operation cells.

Consumers may learn patterns of discounts and market incentives, and will adjust their behavior accordingly, thereby affecting desirable traffic load changes among cells within a rate plan region without the need for publishing complicated maps, committing to contractual discounts, and educating the users with respect to technology complications and details.

BRIEF DESCRIPTION OF THE DRAWINGS

The following detailed description when taken in conjunction with the figures presented herein present a complete description of the present invention.

FIG. 5 shows a typical monthly rate plan pricing table.

DETAILED DESCRIPTION OF THE INVENTION

Figure 1:
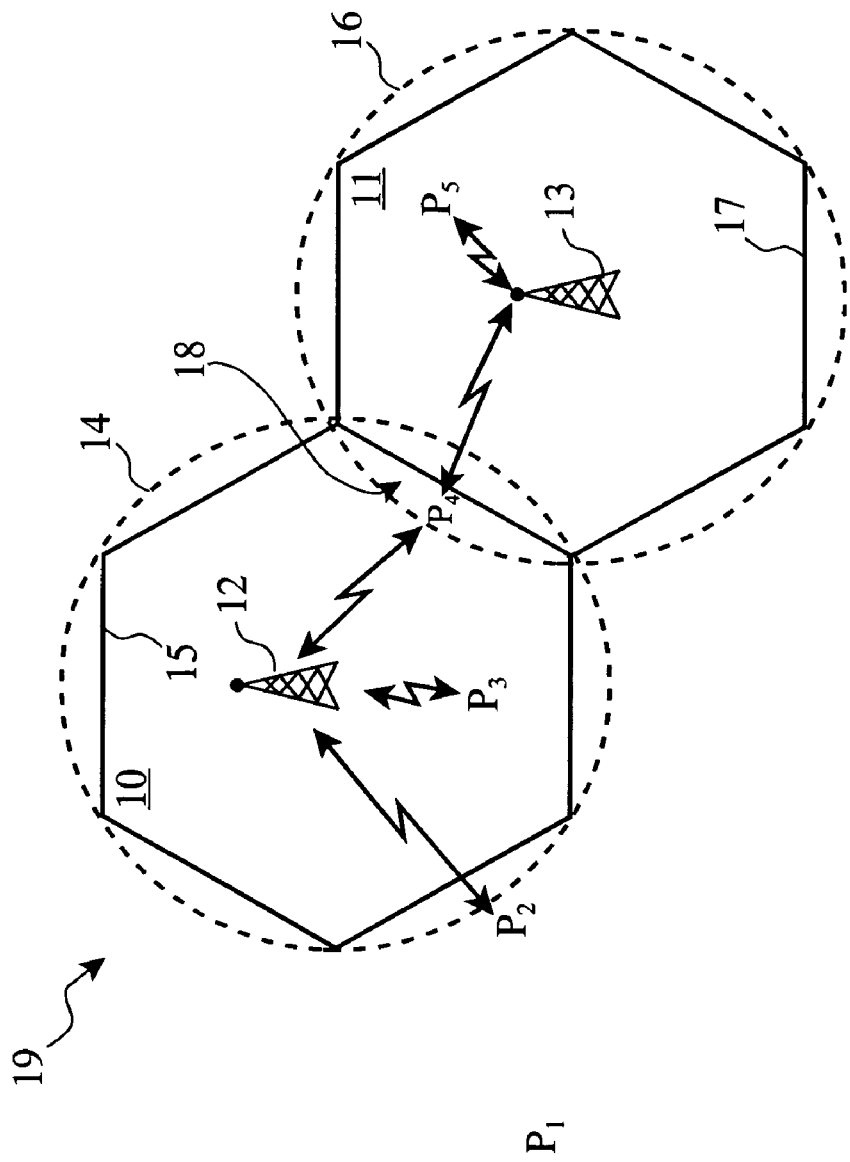
FIG. 1 depicts the architecture of the cellular telephone system including multiple small cells.
Figure 2:
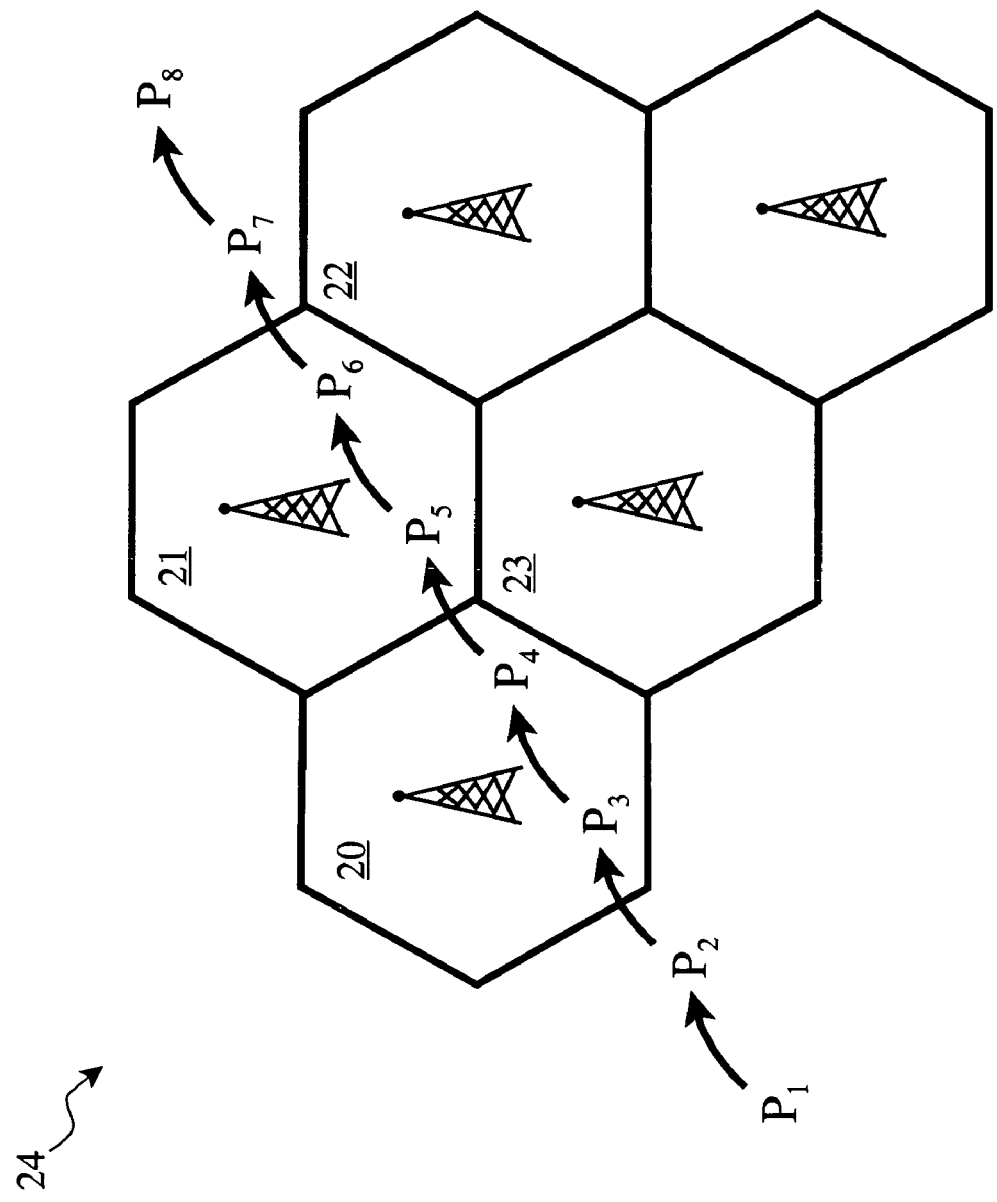
FIG. 2 illustrates a larger portion of a cellular network and how a terminal or handset may traverse multiple positions.
Figure 3:
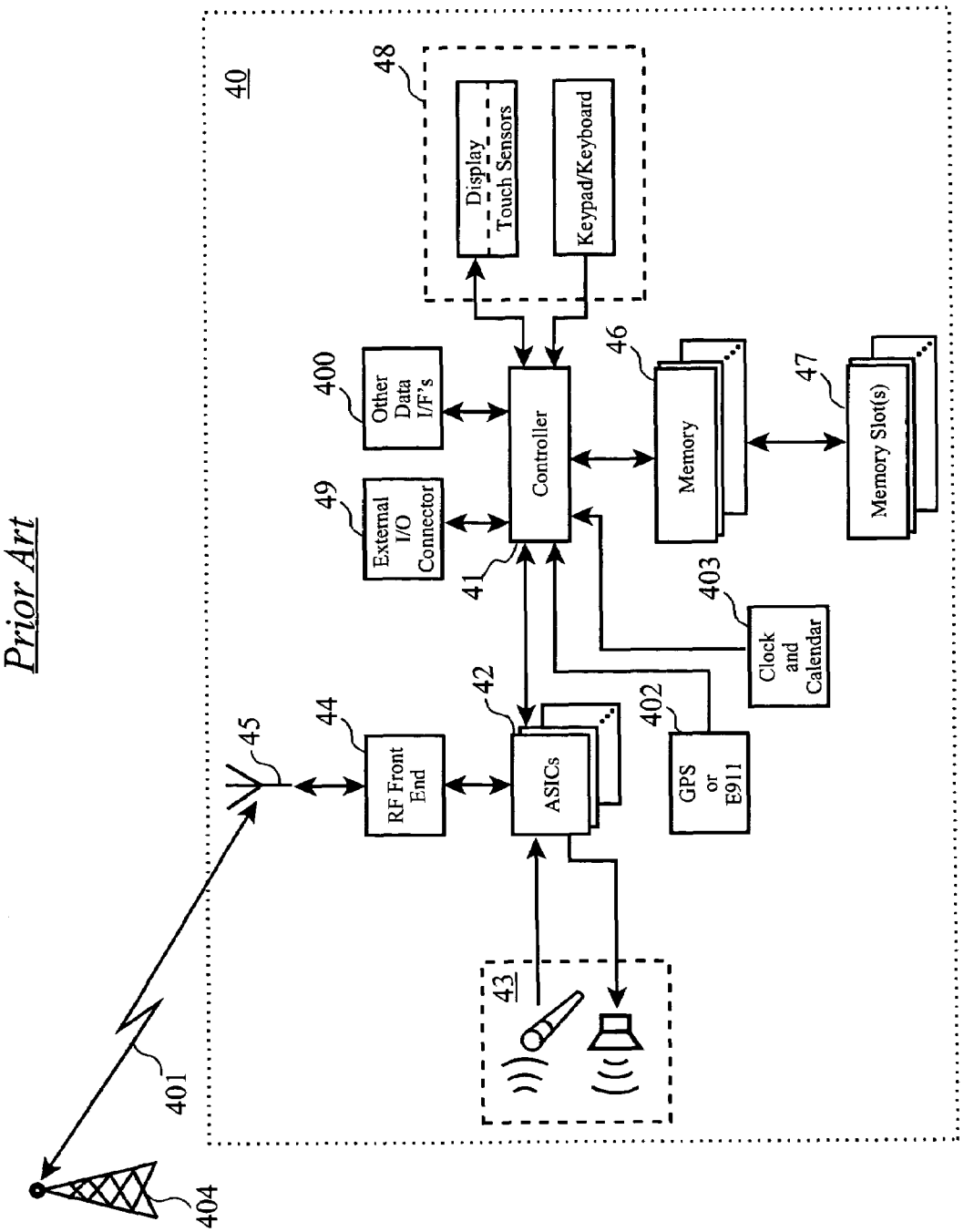
FIG. 3 shows a generalized architecture of cellular telephones and other wirelessly networked devices.
Figure 4:
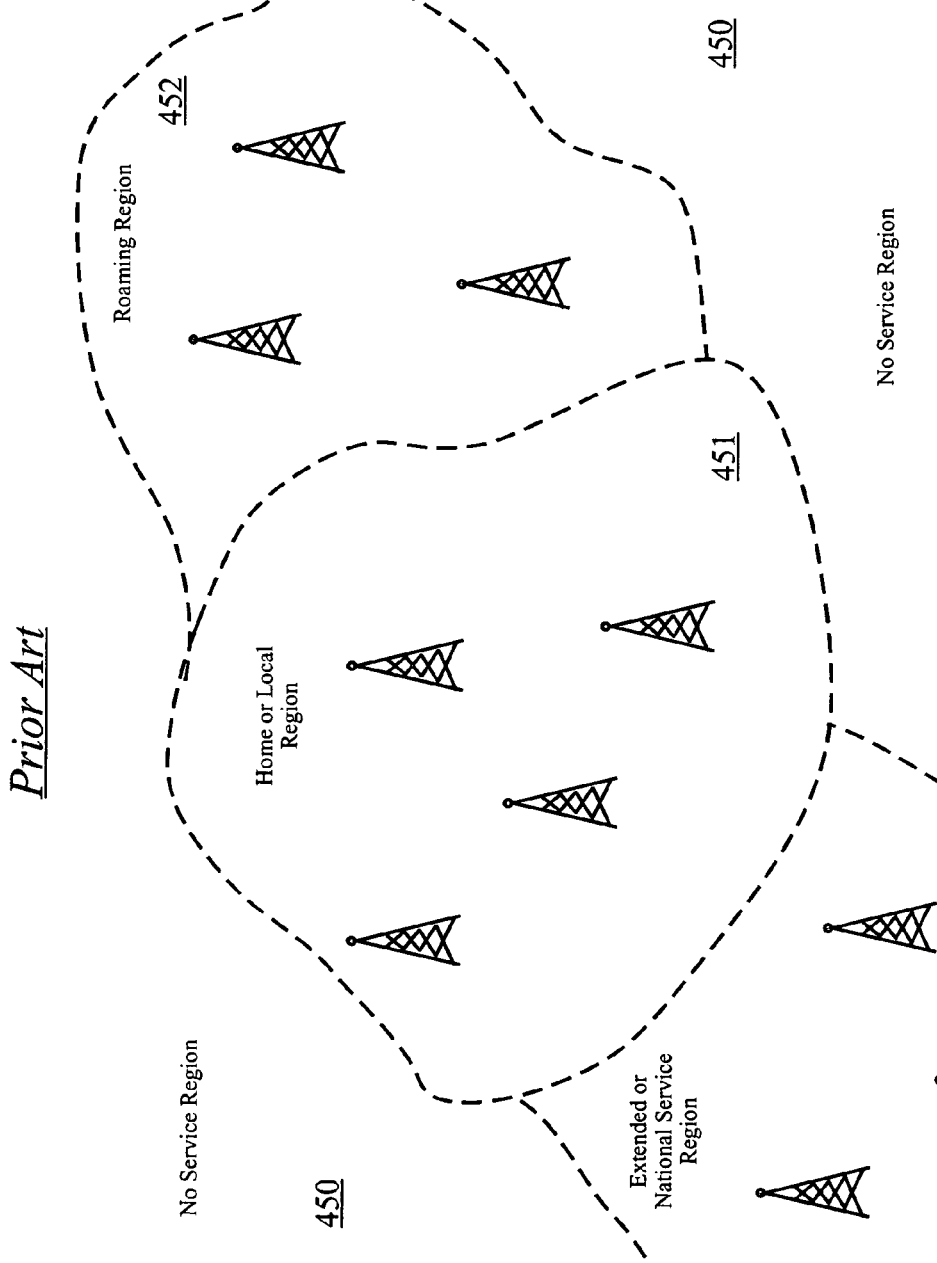
FIG. 4 describes the typical three different regions of coverage.
Figure 6:
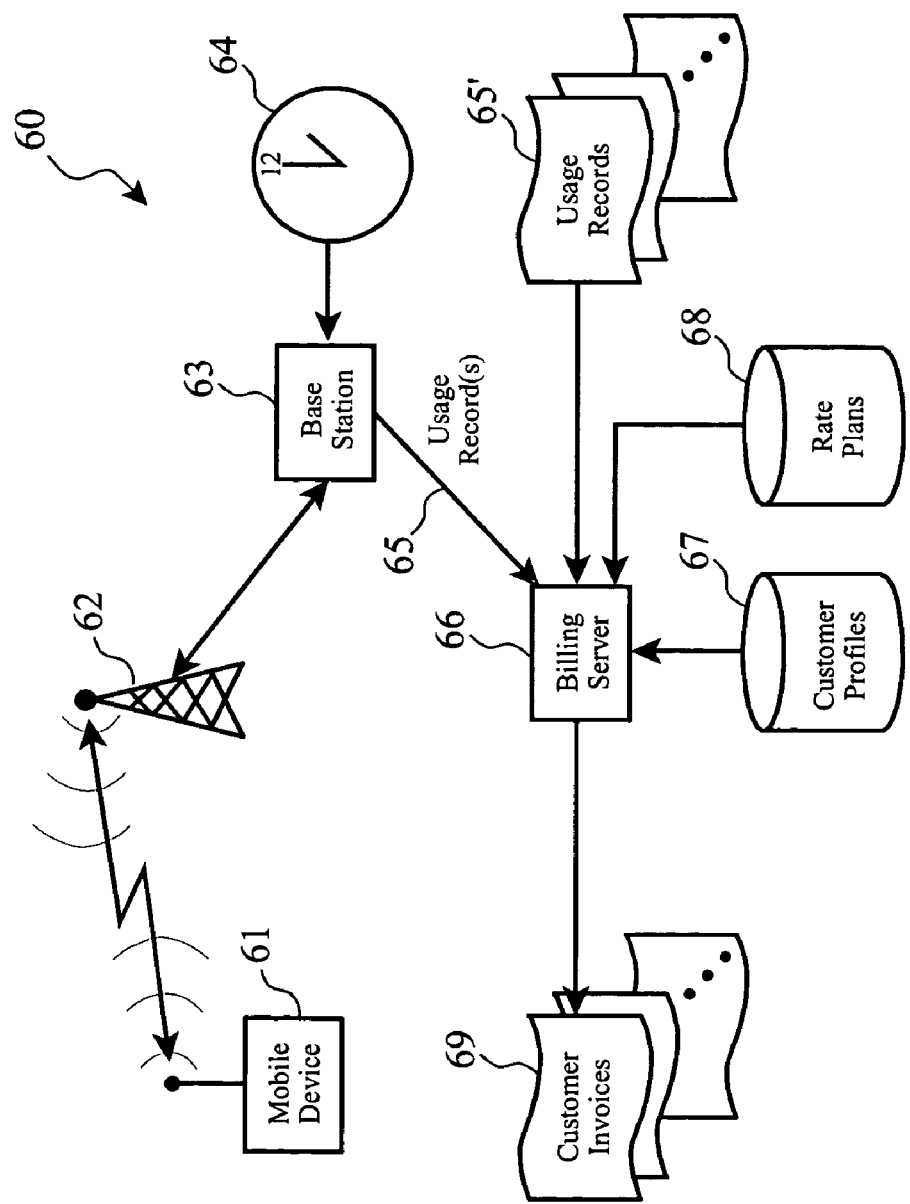
FIG. 6 illustrates the present-day billing reconciliation process.

The present invention is preferably realized as circuitry or firmware stored in a wireless network device's memory (46) and executable by the device's controller (41), cooperating with logical processes provided by a server system operated by a wireless network service provider. The portion of the invention realized as executable by the wireless network device may be preprogrammed into the device, or it may be downloaded from a memory card, the wireless network or another data network or interface, as the capabilities of the device allow and within the business model of the service provider.

Throughout this disclosure, we will refer specifically to and provide examples of embodiments with respect to cellular telephone services. The present invention, however, is not limited to these embodiments, but may equally well be realized in conjunction with any wireless network services and systems wherein the service geography is served by a plurality of radio access points, such as wireless LAN access points, BlueTooth, etc. As such, when we refer to a cell phone or mobile device, we are referring in general to any such wirelessly networked device such as a PDA, cell phone, laptop computer, pager, etc. Additionally, when we refer to a "tower", we are referring to any wireless network access point, such as a LAN wireless access point, a BlueTooth transceiver, and a cellular telephone tower (analog or digital).

Currently, network load smoothing is done using pricing based upon time of day embodied in a region-based rate plan. This entails offering users lower service pricing for weekends and after 7 PM where demands for cell phone usage is less, for example. Rate plans also offer pricing incentives for using the services within certain rate plan regions (e.g. home or local), and pricing premiums for using service in other regions (e.g. roaming).

These rate plan schemes provide no ability, however, for the providers to adjust pricing on a cell-by-cell basis within a rate plan region. As such, new towers, access points, etc., installed within a rate plan region generate the same review as existing towers within that region. Due to differences in cost of operating each tower, and/or due to loading variations among the towers within a rate plan region, some towers may actually generate negative revenue.

The present invention enables cell phone network providers to use pricing as a mechanism to enhance usage of specific cell phone towers within each rate plan region to provide further balancing of traffic among towers within a region, and to allow enhanced return-on-investment ("ROI") on underutilized towers.

Our invention extends upon the region-based rate plans to further allow dynamic variation in service pricing based upon the current utilization of cell towers. Rather than using the traditional area coverage rate plan, or in addition to a traditional area-based plan, a pricing policy is provided by the invention in which the users are shown, real-time, dynamically generated pricing and cost incentives to delay usage in high-traffic or high-cost-of-operation cells, and to encourage usage in low-traffic or low-cost-of-operation cells. Through usage of the invention over time, consumers may learn patterns of discounts and market incentives, and they will adjust their behavior accordingly, thereby affecting desirable traffic load changes among cells within a rate plan region without the need for publishing complicated maps, committing to contractual discounts, and educating the users with respect to technology complications and details. This allows cell phone carriers to make its services more attractive for users to defer using cell phones until a cell tower utilization is low, therefore lowering cost.

Figure 7:
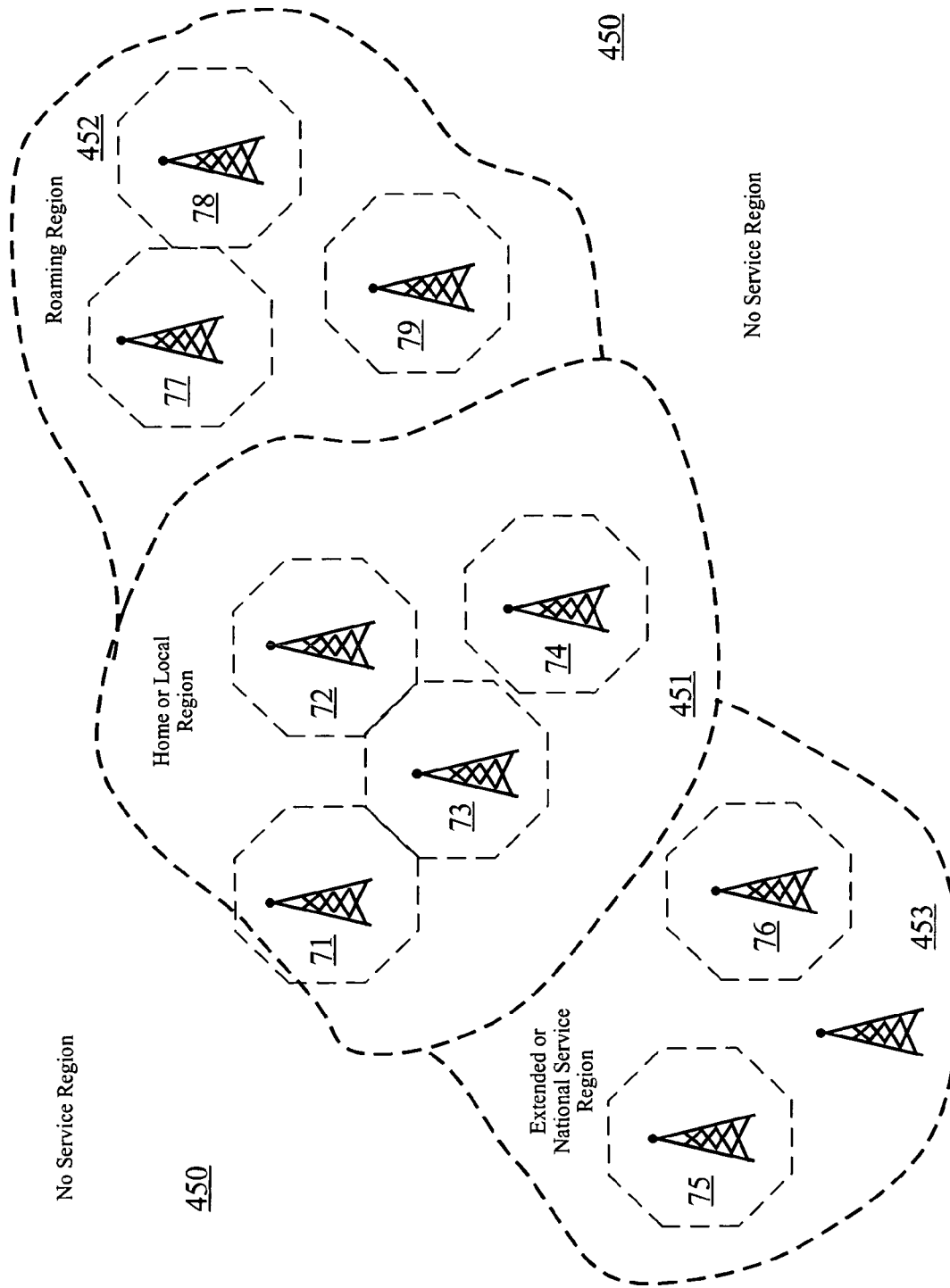
FIG. 7 depicts in more detail a number of service regions, each of which contain multiple cells, in which each cell generates the same revenue as the other cells within the same region.

Turning to FIG. 7, each rate plan region, such as a home or local region (451), contains a plurality of cells (71, 72, 73, 74) Each of the cell towers (71, 72, 73, 74) within the rate plan region have its varied utilization usage depending present and historical user traffic. This is also true in other rate plan regions, such as roaming regions (452) and extended or national regions (453). It will be recognized by those skilled in the art that the pictorial of FIG. 7 is simplified for illustrative purposes, and in practice, each rate plan region comprises of multiple cell towers. It will also be recognized by those skilled in the art that there may be more than one of each type of rate plan region, and that other names or descriptions for rate plan regions may be adopted.

Now let's consider actual traffic or usage of tower's or cells within a region to illustrate the problem to which the invention is directed. For example, a particular cell phone tower that services users working in the vicinity of Times Square, New York City, is much more highly utilized than a cell tower covering a suburb at certain times, such as during the commuting hours to and from work (e.g. 7:00 am-9:00 am and 4:00 pm-7:00 pm). In fact, cell phone usage typically dramatically increases around the end of the work day period in downtown and urban areas, but then traffic on these same towers is relatively light during the weekends and evenings. At other times, though, certain cell towers in the suburban areas will be more heavily loaded than the downtown towers, such as during weekends or holidays when users are congregated closer to their homes.

All of these towers, downtown and suburban, though are located within the same rate plan region according to the typical rate plans offered by service providers today. So, usage of a cell phone during a commute when a tower is heavily loaded generates the same amount of revenue as usage of a cell phone in that same cell when tower traffic is lower, using the region rate plan scheme known in the art.

Consider the wireless service usage habits and patterns of a specific user, who we will call "user A" for our illustrations. When User A ends the work day, a call is placed to User B to confirm a dinner plan, for example. This call would be made soon after leaving the workplace, perhaps on the sidewalk near Times Square while walking to the closest subway station.

Under the current pricing model, the call place by User A will be charged based on the type of monthly plan purchased according to the "local" region rate. The tower serving this cell, though, is experiencing a very high load of traffic, as many other users are doing the same type of thing at the same time (e.g. they are all leaving work and making a personal call). There is little or no incentive for each user to delay a call at this time, say 5:15 pm, because their "nighttime" minutes don't start until 7:00 pm, or even 9:00 pm, which would be too late for organizing dinner plans, for example.

Figure 8:
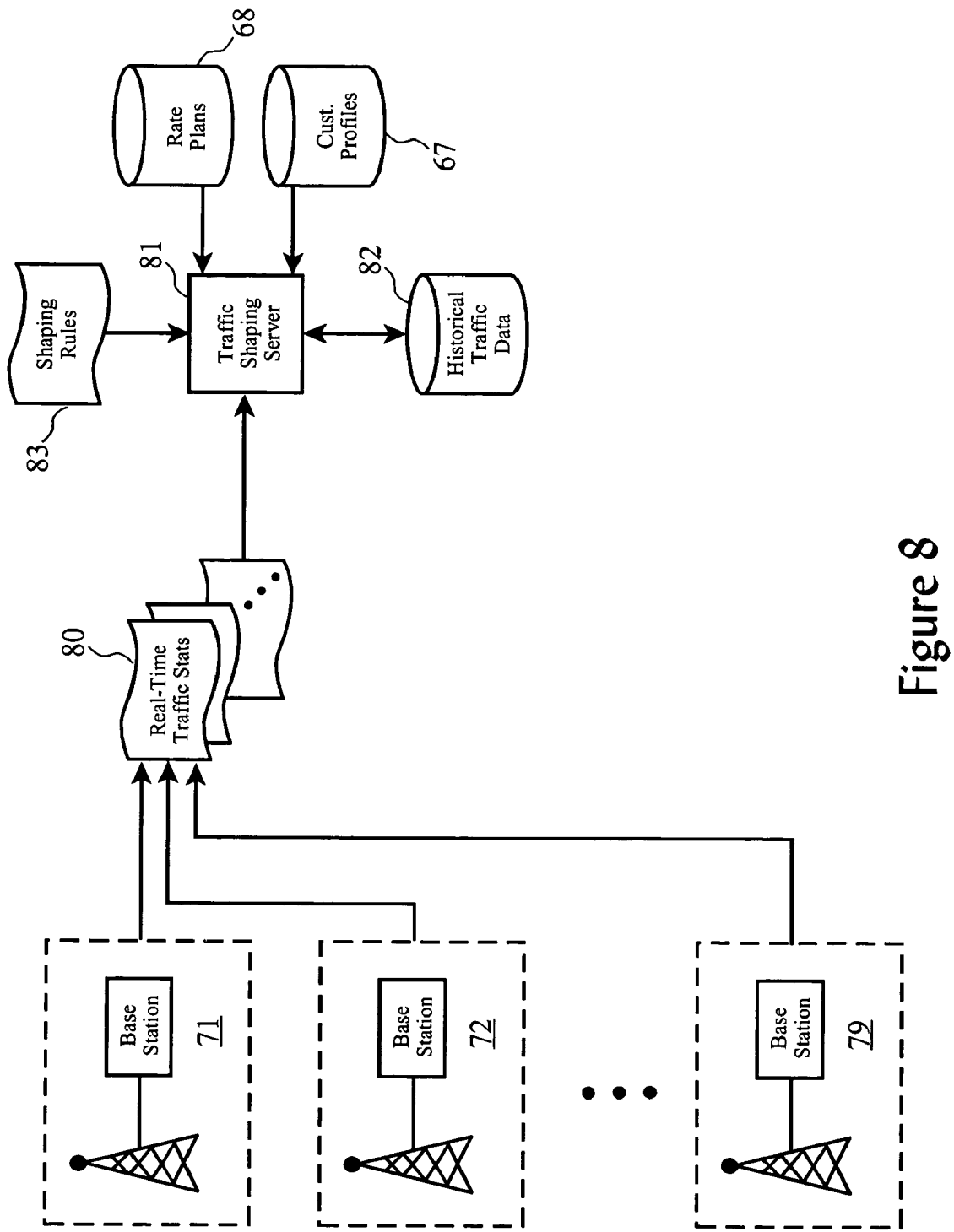
FIG. 8 illustrates a portion of the logical process of the present invention involving collecting real-time usage statistics.

Each tower tracks and maintains its traffic level which varies by components such as number of users servicing, number of calls or services consumed (e.g. calls, sessions, messages, etc.), and length of consumption (if relevant). According to one aspect of the present invention, these statistics and data are utilized as shown in FIG. 8 by collecting real-time usage information from the base stations. Each base station (71, 72, 79) provides real-time traffic and loading statistics (80) to a traffic shaping server (81). The traffic shaping server (81) receives this information in near real-time mode, and the traffic shaping server (81) has access to a set of behavior shaping rules (83), and optionally the user rate plans (68) and customer profiles (67).

Our shaping rules (83) comprise discount policies that define market discounts to be offered to users in order to modify consumption behaviors and direct usage to underutilized or more cost-effective cells within the same rate plan region.

Additionally, using historical data (82) regarding each cell tower's historical usage, the potential utilization of each cell tower at a specific time period can be determined.

With this information, the shaping server (81) can determine when a service is being initiated by a user in a certain cell if that cell is currently highly utilized or loaded, and if so, if there is a nearby or adjacent cell which is relatively lowly utilized or historically underutilized. If so, the user can be provided a signal or indication that a discount would be available for using the service or making the call from an alternate cell, in order to encourage the user to delay service consumption, thereby alleviating the busy cell of the additional traffic. The process of signaling the user is described in more detail in the following paragraphs.

For example, using the present invention, at 5:00 p.m. on a weekday, the carrier can send a notification to User A that the current cell where the user is located is a full price cell. Later, when User A arrives in a lower cost cell (e.g. lower utilized cell), the carrier can send a notification to User A that a discount applies to making calls or using other services while in this cell. It is important to note that the two cells described here are both within the same rate plan region, and would not have been priced differently under the standard region-based rate plan of the prior art.

So, after this set of experiences are had by the user, the user will learn that by delaying his or her call, he or she normally can get a discount. In this example, if the user is leaving the office headed for a 20 minute subway ride to his or her neighborhood, the user notices that when leaving the office building, the rates are full price. But, when emerging from the train station in the neighborhood, there is a discount available. As such, the user will learn to take advantage of the discounts by delaying non-urgent calls for a few minutes until he or she is in the lower cost cell.

Through this method, the present invention encourages user behavior changes without committing to a new rate plan, without publishing new rate plans, and can accommodate dynamic changes in the network loading conditions. For example, if in the future the cell in the neighborhood also becomes historically busy during the 5:00-6:00 p.m. range, the discount offer can be discontinued by simply not indicating a discount to the user.

Figure 9:
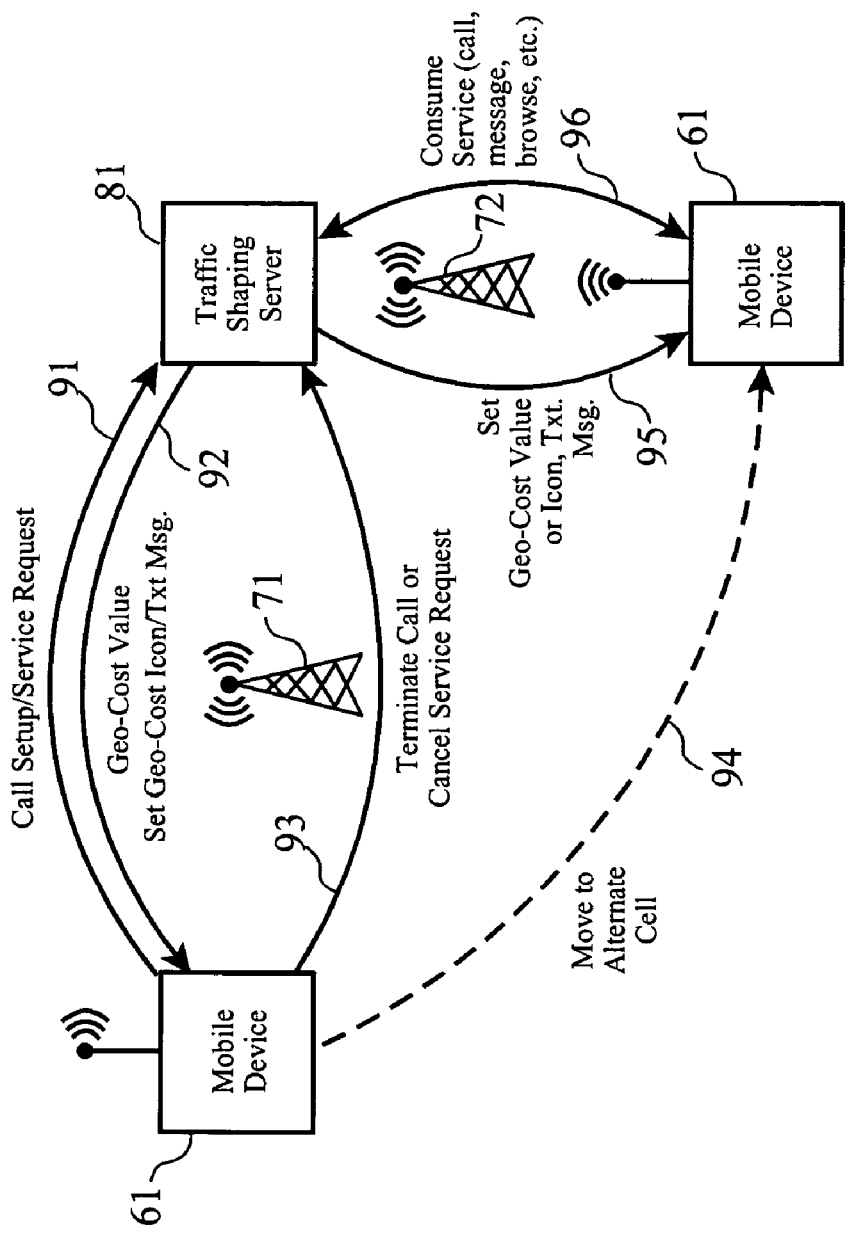
FIG. 9 shows user consumption behavior modified by service incentives according to the present invention.

The foregoing example is illustrated in a general sense in FIG. 9, which can be interpreted for any number of other sequences of actions of a user and the wireless network system. Rather than having User A making a call near Times Square using the user's mobile device (61) at a certain time, a call made in the Bronx may be given a discount after the user moves (94) to a more underutilized cell. More specifically, the mobile device (61) within the first cell (71) initiates a call (91) or other service request (e.g. text message, web browsing, etc.), which is intercepted by our traffic shaping server (81).

The traffic shaping server (81) conducts a check on all the real-time statistics of the cell (71), and potentially of other cells within the same rate plan region, and sends a geographical cost ("geo-cost") value notification back to the mobile device (92). This notification can be any of several embodiments, including setting an icon on the mobile device's display, sending a text message to the mobile device, or providing: a data value to the mobile device which is then used by a program on the mobile device to notify the user (e.g. the mobile device may receive a data value and then may display it, annunciate it using voice or tones, etc.). User A, knowing that discounts may be available in other cells, may decide to cancel the current call (93) or service request, and to make the call at a later time after relocating (94) to another cell (72).

When the mobile device (61) reaches the new cell tower coverage (72), if the cell where the mobile device is currently located is an underutilized or low-cost cell, the shaping server will determine this using the real-time traffic statistics, rate plans and shaping rules as previously described. Then, an updated geo-cost indicator is provided (95) to the mobile device which will alert the user to the fact that a discount currently applies to calls or services consumed from this cell. So, for example, once our hypothetical User A arrives in his or her neighborhood, perhaps the Bronx, the geo-cost indicator on the phone will be updated to show a discount is in effect. This may result in the user deciding to initiate and consume (96) a service.

When this pattern is repeated a few times to the user, most users will learn that discounts are usually available at certain times on certain days in certain places (e.g. in certain cells). They will learn only the portions of the discount plan that apply to them, thereby minimizing the "learning curve" which would be otherwise required to understand a complicated table of rates, times, and a map of cells within a rate plan region. Additionally, as traffic is redirected historically to cells which are underutilized, the discounts offered can be lessened or even eliminated. Even when the discounts are eliminated, some consumers will continue their habit of placing calls in the lower cost cells.

Figure 10:
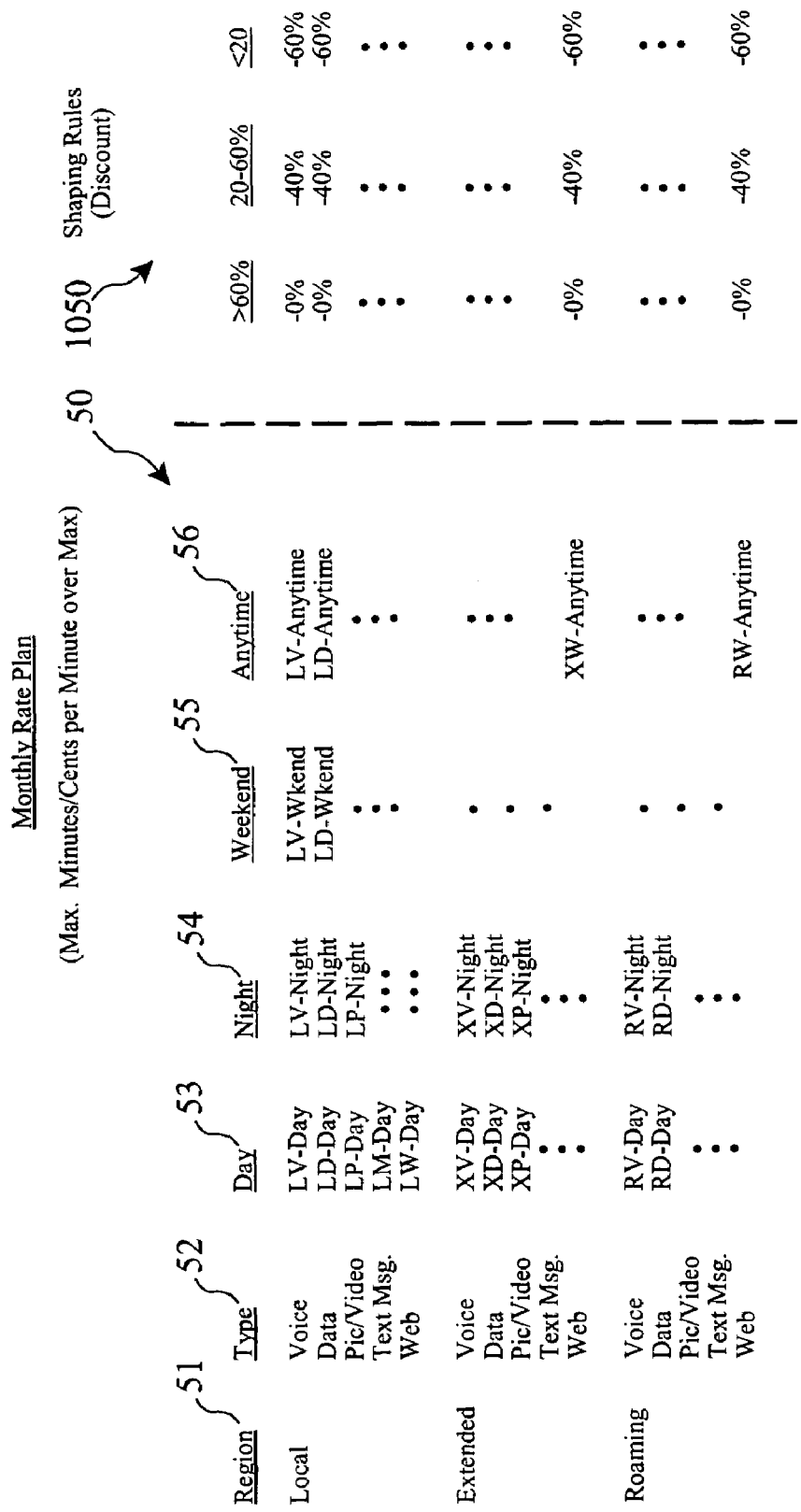
FIG. 10 shows usage shaping rate rules according to one aspect of the present invention, the Graduated/Stand-alone Discount Profile.

By offering incentives to consumers in this manner, one embodiment of an incentive pricing model (1050) according to the invention can be realized in our shaping rules as shown in FIG. 10. Cell phone network providers can offer discounts based on percentage of tower utilization in this model. For example, if a cell tower is more than 60% occupied at a certain time, then no discounts are available. However, if the tower traffic is between 20% and 60% utilized, then a 40% discount can be applied to calls made from that cell at that time. These discounts can be applied to the standard or "full" rates for that rate plan region and period of time. For example, if the user is within a 50% utilized cell in an extended rate plan region at night and is attempting to send a text message, the "full" rate of XM-Night is reduced by 50%. For cells with even greater underutilization, such as less that 20% utilization in this example, even greater discounts (e.g. –60%) can be offered. This pricing strategy promotes usage awareness and encourages change in user consumption behavior—the greater the discounts offered, the greater the incentive to change usage patterns, and the greater the return to the service provider. Of course, our example here uses three tiers of cell tower utilization, which could be expanded to any number of tiers (from 2 to many). Likewise, different discount rates can be defined for different types (52) of service even though we have shown for simplicity similar discount rates among different types of service.

Figure 11:
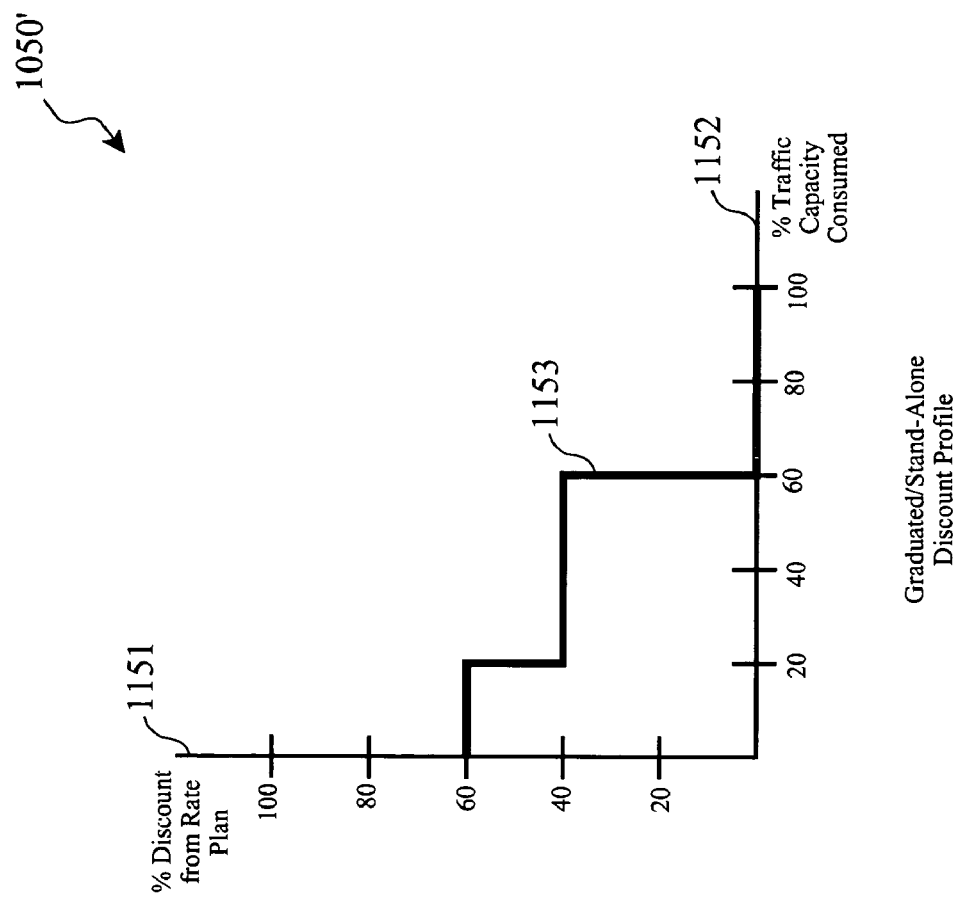
FIG. 11 depicts our Graduated/Stand-alone Discount Profile in graphical format.

The shaping rules described in the foregoing paragraph and shown in FIG. 10 are our Graduated/Stand-Alone ("GSA") pricing policy, which is shown graphically in FIG. 11. The amount of discount (1151) from standard or full rate is a stepwise function (1153) of the traffic loading (1152) of a particular cell at a given time and/or historically.

Figure 12:
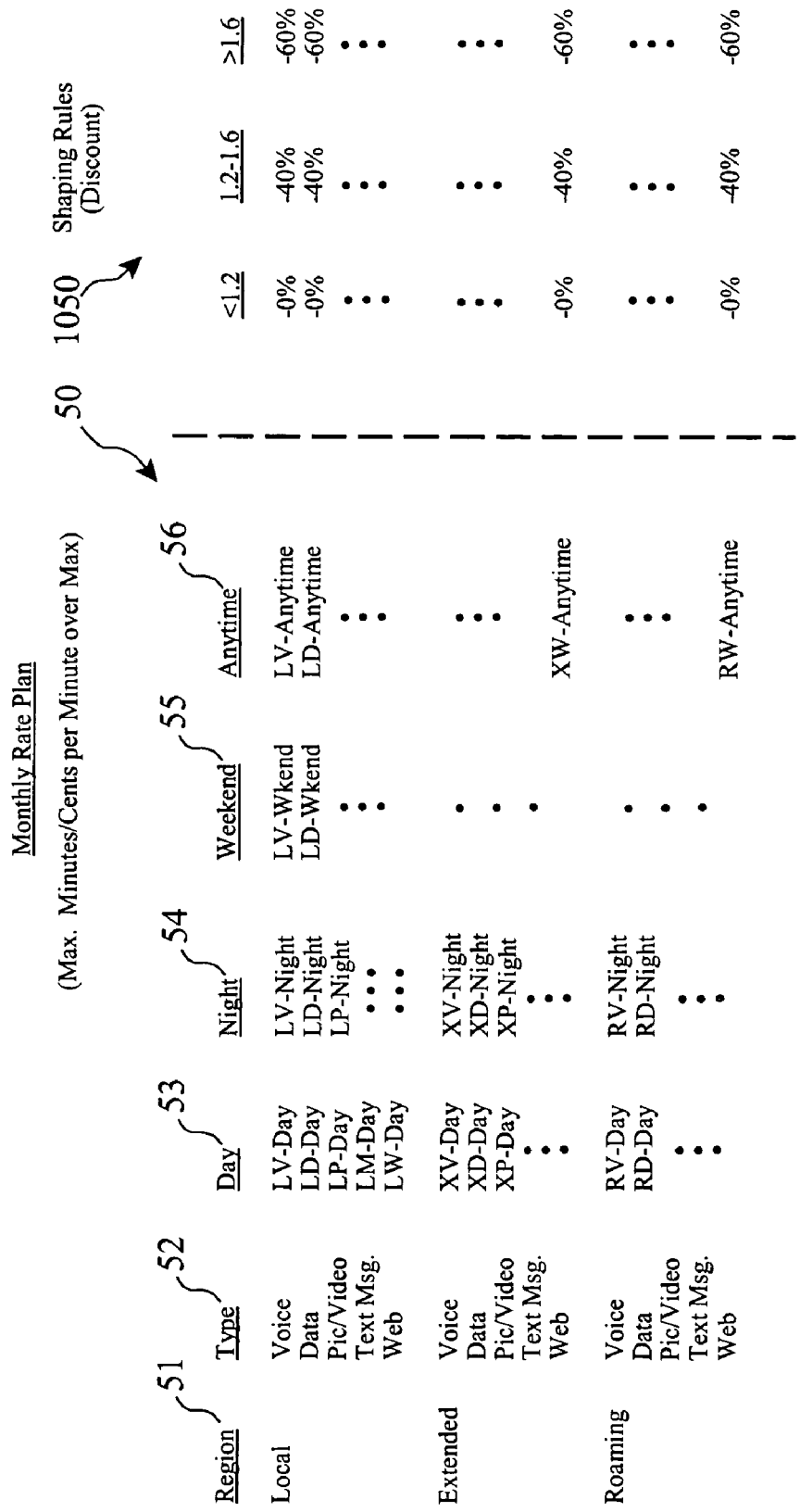
FIG. 12 illustrates another aspect of the present invention, Graduated/Comparative Discount Profile.

Turning to FIG. 12, an alternate set of shaping rules (1050'), which we refer to as a Graduated/Comparative ("GC") discount policy, is illustrated in correlation to a standard region-based rate plan (50). Rather than providing discount thresholds which are a function solely on traffic conditions within the cell where the mobile device is currently located, the GC policy produces discounts as a function of relative traffic conditions between the current cell where the user is located and adjacent cells (e.g. cells where the user is most likely to travel soon). This is provided in this example policy by taking a ratio of an adjacent cell's utilization compared to the current cell's utilization, and then what percentage discount is due. For example, if the adjacent cell is less utilized (e.g. ratio is less than 1.0) up to 20% more utilized than the current cell, no discount would be offered (e.g. the neighboring cell is similarly loaded). However, if the neighboring cell is particularly more loaded than the current cell (e.g. the ratio is 1.2-1.6), then a discount, perhaps 40%, would be offered to encourage the user to a place a call or use a service now in the current cell (rather than potentially waiting and placing the call when located in the higher utilized cell). Likewise, the adjacent cell is greatly much more utilized than the current cell (e.g. ratio is greater than 1.6), and even greater discount or incentive is offered to the user to encourage placing the call in the current cell.

Figure 13:
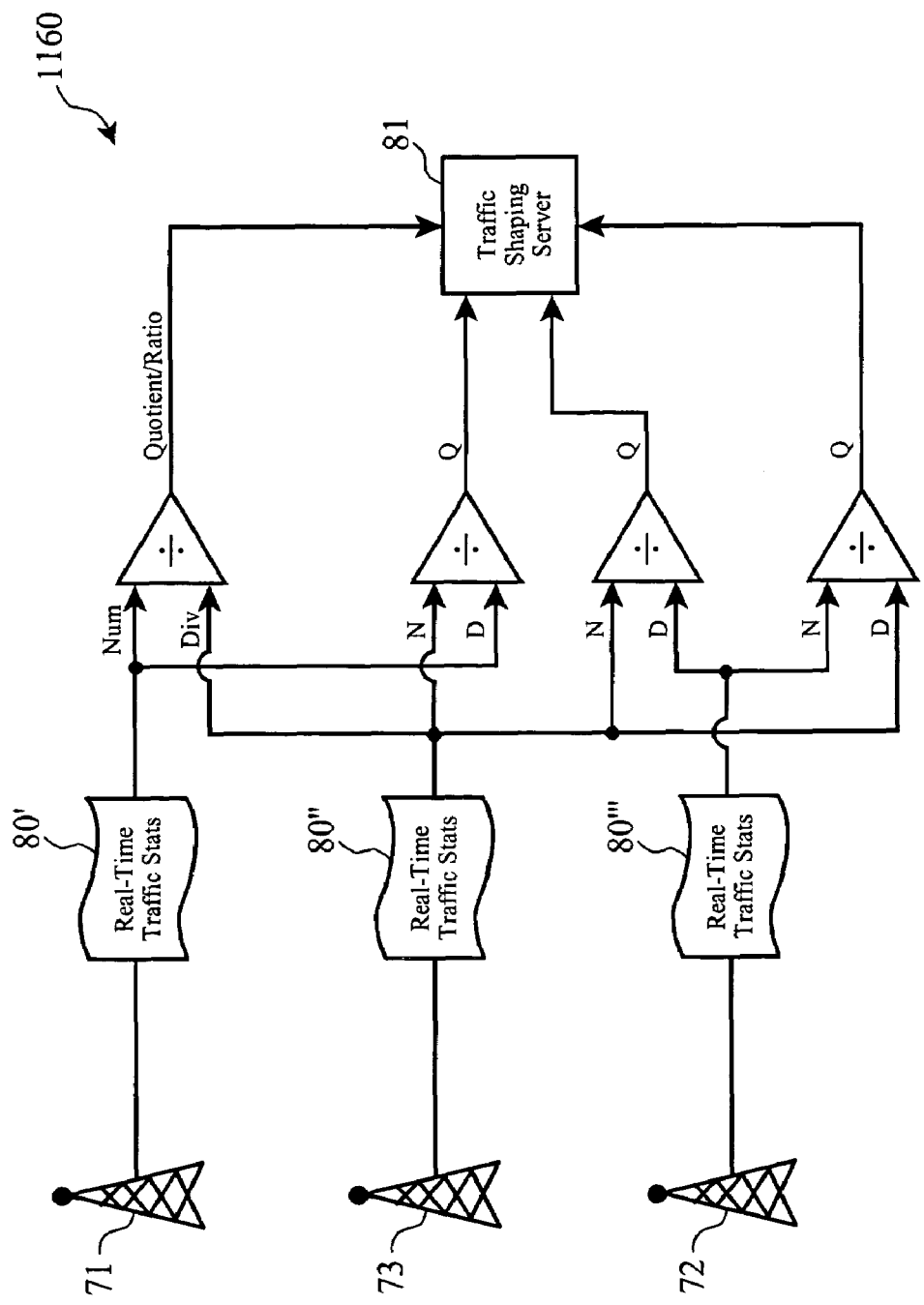
FIG. 13 illustrates a portion of the logic of the present invention according to the Graduated/Comparative Discount Profile aspect.

FIG. 13 illustrates the logic of comparing utilization statistics (80', 80''') of adjacent cells (71, 72) to a current cell (73) utilization statistics (80'') using ratio calculators (1161), the results of which can be considered by the shaping server (81).

As mention previously, discount notifications are sent to mobile devices when it becomes available. These geo-cost notifications can display in various forms such as icons, text messages, or value. However, it will be recognized by those skilled in the art that the present invention is not limited to the following display formats, but may be alternatively realized.

For example, a text message reading as follows could be sent to the mobile device when a discount is being offered in a particular cell:

"Cool!! Make a call now and save an extra 20%!
Thanks for Using MegaServe Wireless today!"

Figure 14:
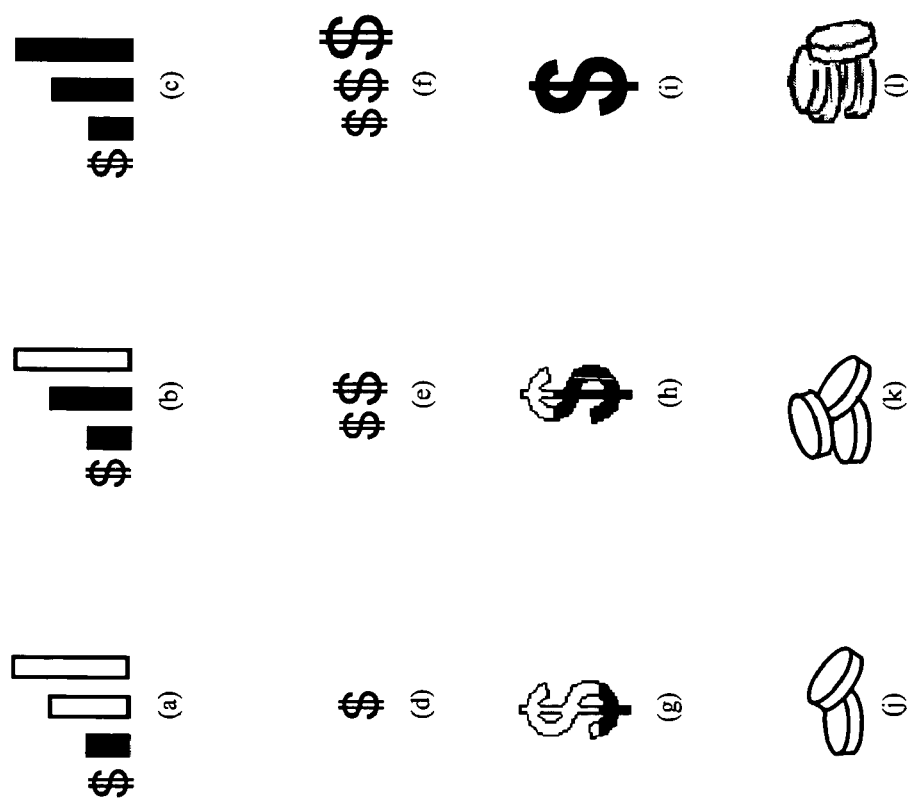
FIG. 14 depicts several optional embodiments of a geo-cost notifications icon for display on a cellular telephone, PDA, or other mobile device's user interface.

Alternatively, a geo-cost icon or indicator can be displayed on the mobile device's user interface, such as those shown in FIG. 14. For example, to notify users the costs of each call, a cost meter can be used to show gradual increasing costs one bar (a) for highly discounted, to two bars (b) with some discount, to full or standard rate (c).

Following a similar scheme, alternate iconic representations can be dollar signs of graduated size from greatest discount to standard rate (d, e, f respectively), a partially filled dollar sign (g, h, i), or stacks of coins (j, k, l).

Any of these icons can be filled with numerous colors to denote changes or value, such as using green for greatest discount and red for standard rate. Also, the use of any other graphic symbol which readily conveys the meaning of cost or money can be used in place of the dollar symbols, especially for systems designed for use in cultures which use other monetary symbols such as the British pound £, the European Union's Euro €, or the Japanese Yen ¥.

According to another embodiment, a downloaded JAVA applet executed by the mobile device can receive a data value from the shaping server, and then can determine how to notify the user of the discount opportunities using icons, images, and/or sounds.

CONCLUSION

The present invention has been described in general terms and by use of illustrative embodiment examples. It is within the skill of those in the art to make certain alterations or modifications, such as programming language, computing platforms, implementation methodology, in order to realize an alternative embodiment of the invention for use with an alternative system. Therefore, the scope of the present invention should be determined by the following claims.

What is claimed is:

1. A system for encouraging changes in user behavior of usage of wireless services in order to effect shaping of traffic and utilization patterns among a plurality of cells within a rate plan region, said system comprising:
    a rate plan defining at least one standard charge rate of service consumption for services consumed within a rate plan region;
    one or more shaping rules which define potential discounts from said standard charge rate under certain cell-specific utilization conditions, said shaping rules comprising at least a graduated comparative function of a percentage discount from said standard charge rate as a function of a ratio of utilization of a current cell and a geographically adjacent cell;
    a receiver for receiving utilization statistics for each of a plurality of cells within said rate plan region;
    an analyzer configured to, responsive to receipt of a service initiation request from a mobile device located within a rate plan region and within a given cell, consider one or more shaping rules with respect to said received utilization statistics, and to generate a discount value relative to said standard charge rate; and
    a user notifier settable by said analyzer for notifying a user of said mobile device of said discount value available for consuming a wireless service from said given cell in order to encourage said service consumption and to effect behavior modification of said user over a period of time.

2. The system as set forth in claim 1 wherein said shaping rules further comprise an additional rule comprising graduated continuous function of a percentage discount from said standard charge rate as a function only of utilization of one cell.

3. The system as set forth in claim 2 wherein said function comprises a stepwise function.

4. The system as set forth in claim 1 wherein said user notifier comprises a text message.

5. The system as set forth in claim 1 wherein said user notifier comprises a displayable cost meter.

6. The system as set forth in claim 1 wherein said user notifier comprises a set of monetary symbols of graduated size.

7. The system as set forth in claim 1 wherein said user notifier comprises a monetary symbol having a percentage of fill correlating to cost.

8. The system as set forth in claim 1 wherein said user notifier comprises an icon have a plurality of colors correlated to cost.

9. A method for changing user behavior of usage of wireless services in order to effect shaping of traffic and utilization patterns among a plurality of cells within a rate plan region, said method comprising the steps of:
    accessing a rate plan having at least one standard charge rate of service consumption for services consumed within a rate plan region;
    defining one or more shaping rules having potential discounts from said standard charge rate under certain cell-specific utilization conditions, said shaping rules comprising at least a graduated comparative function of a percentage discount from said standard charge rate as a function of a ratio of utilization of a current cell and a geographically adjacent cell;
    receiving utilization statistics for each of a plurality of cells within said rate plan region;
    responsive to receipt of a service initiation request from a mobile device located within a rate plan region and within a given cell, generating a discount value relative to said standard charge rate in consideration of one or more shaping rules with respect to said received utilization statistics of one or more given cells within said rate plan area; and
    setting a notifier indicating to said user said discount value available for consuming a wireless service from a given cell in order to encourage said service consumption and to effect behavior modification of said user over a period of time.

10. The method as set forth in claim 9 wherein said step of defining shaping rules comprises defining an additional shaping rule comprising a graduated continuous function of a percentage discount from said standard charge rate as a function only of utilization of one cell.

11. The method as set forth in claim 10 wherein said function comprises a stepwise function.

12. The method as set forth in claim 9 wherein said step of setting a user notifier comprises transmitting a text message.

13. The method as set forth in claim 9 wherein said step of setting a user notifier comprises displaying a cost meter.

14. The method as set forth in claim 9 wherein said step of setting a user notifier comprises providing a set of monetary symbols of graduated size.

15. The method as set forth in claim 9 wherein said step of setting a user notifier comprises providing a monetary symbol having a percentage of fill correlating to cost.

16. The method as set forth in claim 9 wherein said user notifier comprises providing an icon have a plurality of colors correlated to cost.

17. An article of manufacture for changing user behavior of usage of wireless services in order to effect shaping of traffic and utilization patterns among a plurality of cells within a rate plan region, comprising:
 a computer readable medium suitable for encoding computer program code; and
 one or more computer program codes encoded by said computer readable medium, configured to cause a processor to perform the steps of:
 (a) accessing a rate plan having at least one standard charge rate of service consumption for services consumed within a rate plan region;
 (b) defining one or more shaping rules having potential discounts from said standard charge rate under certain cell-specific utilization conditions, said shaping rules comprising at least a graduated comparative function of a percentage discount from said standard charge rate as a function of a ratio of utilization of a current cell and a geographically adjacent cell;
 (c) receiving utilization statistics for each of a plurality of cells within said rate plan region;
 (d) responsive to receipt of a service initiation request from a mobile device located within a rate plan region and within a given cell, generating a discount value relative to said standard charge rate in consideration of one or more shaping rules with respect to said received utilization statistics of one or more given cells within said rate plan area; and
 (e) setting a notifier indicating to said user said discount value available for consuming a wireless service from a given cell in order to encourage said service consumption and to effect behavior modification of said user over a period of time.

18. The article as set forth in claim 17 wherein said program code for defining shaping rules further comprise program code for defining shaping rules which include a graduated continuous function of a percentage discount from said standard charge rate as a function only of utilization of one cell.

19. The article as set forth in claim 18 wherein said function comprises a stepwise function.

20. The article as set forth in claim 17 wherein said program code for setting a user notifier comprises program code for transmitting a text message.

21. The article as set forth in claim 17 wherein said program code for setting a user notifier comprises program code for displaying a cost meter.

22. The article as set forth in claim 17 wherein said program code for setting a user notifier comprises program code for providing a set of monetary symbols of graduated size.

23. The article as set forth in claim 17 wherein said program code for setting a user notifier comprises program code for providing a monetary symbol having a percentage of fill correlating to cost.

24. The article as set forth in claim 17 wherein said program code for setting a user notifier comprises program code for providing an icon have a plurality of colors correlated to cost.

* * * * *